UNITED STATES PATENT OFFICE.

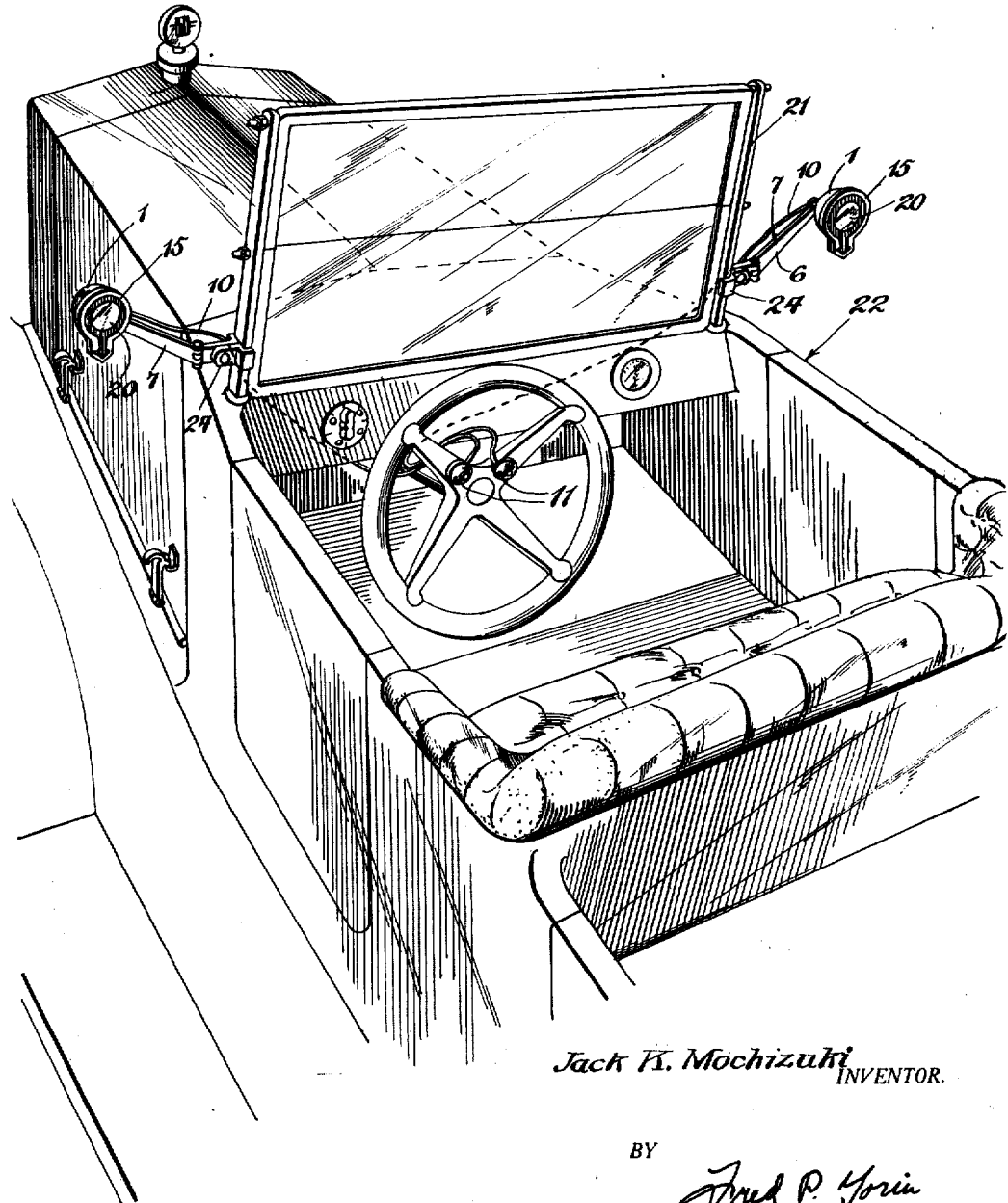

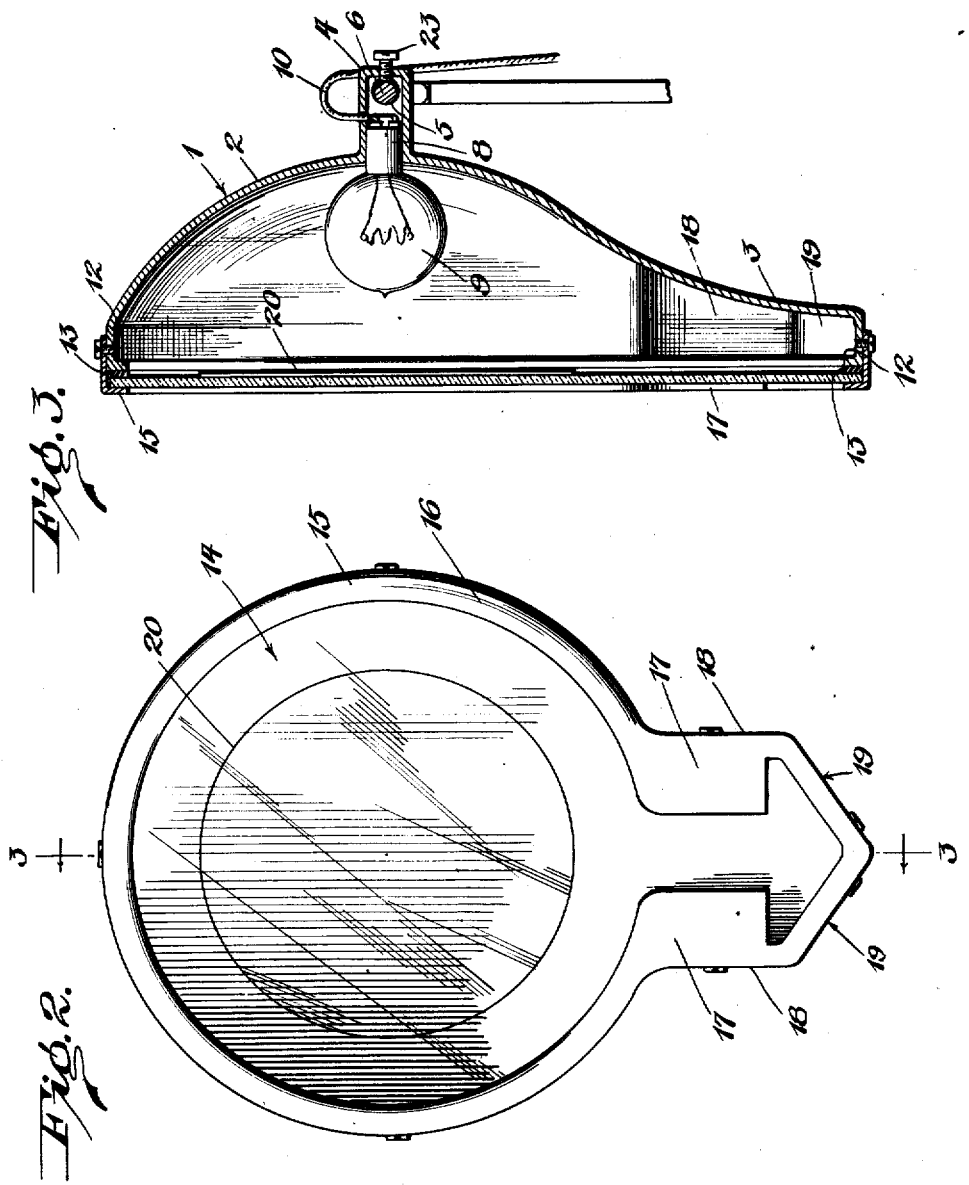

JACK K. MOCHIZUKI, OF SEATTLE, WASHINGTON.

SIGNALING DEVICE.

1,368,644.  Specification of Letters Patent.  Patented Feb. 15, 1921.

Application filed May 12, 1920. Serial No. 380,805.

*To all whom it may concern:*

Be it known that I, JACK K. MOCHIZUKI, a subject of Japan, residing at Seattle, in the county of King and State of Washington, have invented certain new and useful Improvements in Signaling Devices, of which the following is a specification.

This invention relates to improvements in signaling devices for automobiles.

An object of the invention is to provide a device by which an operator of an automobile can see or signal vehicles in the rear.

Another object of the device is to provide a novel construction in which the signaling means surrounds the reflecting means.

The invention also comprehends improvements in the details of construction and operation which are particularly pointed out in the following description and claims.

In the drawings:—

Figure 1 is a view of a portion of an automobile, showing the invention applied thereto.

Fig. 2 is a rear elevation of the device.

Fig. 3 is a sectional view on line 3—3 of Fig. 2.

1 indicates a body portion of the device, which is formed with a partial spherical shaped portion 2, and extending portion 3 from the bottom thereof. The portion 2 is formed with a hollow extension 4, provided with holes 5 through which the arm 6 of a supporting bracket 7 is adapted to pass, and which supports the device. The hollow extension 4 is also adapted to receive a socket 8 for an electric bulb 9 which is connected by wires 10 with a circuit controlled by push buttons 11, for lighting the lamp at will.

The edge of the body portion is inturned as indicated at 12 and a washer 13 fits against this edge portion and forms a backing for a glass plate 14, which is secured to the body portion by a ring 15. As shown in Fig. 2, the portion of the ring extending around the circular portion of the opening has an overturned edge 16 which is equally spaced from the edge of the body, and which engages the glass to hold it in position. The portion of the ring which fits over the extending portion of the body is formed with an elongated overturned edge at 17, the purpose of which will be described.

As shown in Fig. 2, the extending portion of the body is formed with straight walls 18, the bottom ends of which are joined by tapered portions 19, and the ring is correspondingly shaped to fit over the body.

The glass plate 14 is silvered on the inner surface as indicated at 20 in the center portion of the plate to form a mirror. The portion of the glass plate between the silvered portion and the edge may be ground and colored red, and as shown in Fig. 2, forms an arrow shaped portion in conjunction with the ring 15. When the lamp is illuminated, the elongated edge 17 covers a portion of the glass over the extending portion of the body, so that an arrow head will be formed in the bottom part of the extending portion.

Two of these devices are used, one being mounted on either side of the wind shield 21 of the automobile 22 as indicated in Fig. 1. A set screw 23 adjustably secures the body portion to the arm 6 and the bracket 7 is secured to the wind shield by clamping member 24. As shown in Fig. 1, the push buttons 11 are mounted on the steering wheel of the automobile so that they are within easy reach of the operator.

When the operator of an automobile running down a street, wishes to turn a corner, he may observe a vehicle in the rear in the mirror 20, and if necessary may signal the vehicle his intention to turn and the direction in which he intends to turn, by pressing one of the buttons 11 which will illuminate the body of the device, so that the arrow head and the circular tail portion will be observed by the operator of the vehicle in the rear.

It will be obvious then, that a novel combination of a lamp and a mirror has been produced so that the lamp when illuminated will form an arrow with a head and a circular tail portion which will signal an intended movement of the vehicle on which it is placed.

What I claim is:

1. A combination signaling device and mirrorscope comprising a body portion formed with an open circular portion and extending portion, a glass plate for covering said open portions and conforming to the shape thereof and having a silvered portion in the center of the circular portion, forming a mirror, a rim adapted to be secured to the body to hold the glass plate in place, and formed with an inturned flange having elongated extensions and means for illuminating the body and plate whereby the inturned edge of the rim and the silvered portion will cause the illuminated portion of the body to appear as an arrow.

2. A signaling device and mirrorscope comprising a body having a partial spherical shaped portion and an extending portion terminating in an inturned edge, a glass plate shaped to fit the body portion, a rim adapted to hold the plate on the body and conforming with the edge thereof, having an inturned edge with elongated portions covering the glass over part of the extending portion, the center portion of the glass plate being silvered to form a mirror, the remaining portion thereof forming an arrow with the inturned edge of the rim, and means for illuminating the arrow.

In testimony whereof I affix my signature.

JACK K. MOCHIZUKI.